(12) United States Patent
Salazar

(10) Patent No.: US 11,083,975 B2
(45) Date of Patent: Aug. 10, 2021

(54) FLUID INLET DEVICE FOR USE IN GAS LIQUID SEPARATORS

(71) Applicant: FMC Separation Systems, BV, Arnhem (NL)

(72) Inventor: Oscar Salazar, Arnhem (NL)

(73) Assignee: FMC Separation Systems, BV, Arnhem (NL)

( * ) Notice: Subject to any disclaimer, the term of this patent is extended or adjusted under 35 U.S.C. 154(b) by 123 days.

(21) Appl. No.: 16/097,602

(22) PCT Filed: Jan. 24, 2017

(86) PCT No.: PCT/EP2017/051403
§ 371 (c)(1),
(2) Date: Oct. 29, 2018

(87) PCT Pub. No.: WO2017/190852
PCT Pub. Date: Nov. 9, 2017

(65) Prior Publication Data
US 2019/0151766 A1    May 23, 2019

(30) Foreign Application Priority Data
May 2, 2016  (NO) .................................. 20160731

(51) Int. Cl.
*B01D 3/00* (2006.01)
*B01D 19/00* (2006.01)
*B01D 45/12* (2006.01)
*B01D 45/00* (2006.01)

(52) U.S. Cl.
CPC ......... *B01D 3/008* (2013.01); *B01D 19/0057* (2013.01); *B01D 45/00* (2013.01); *B01D 45/12* (2013.01)

(58) Field of Classification Search
None
See application file for complete search history.

(56) References Cited

U.S. PATENT DOCUMENTS

| | | |
|---|---|---|
| 1,915,436 A | 6/1933 | Moore et al. |
| 1,917,606 A | 7/1933 | Sillers |
| 2,004,467 A | 6/1935 | Hawley |
| 3,192,691 A | 7/1965 | Ely |
| 5,755,965 A | 5/1998 | Reiber |
| 7,144,437 B2 | 12/2006 | Christiansen et al. |
| 9,765,265 B2 * | 9/2017 | Ball, IV .............. B01D 21/2494 |
| 2005/0060970 A1 | 3/2005 | Polderman |
| 2008/0168753 A1 | 7/2008 | Christiansen et al. |

FOREIGN PATENT DOCUMENTS

| | | |
|---|---|---|
| WO | WO 00/74815 A2 | 12/2000 |
| WO | WO 02/100516 A2 | 12/2002 |

* cited by examiner

*Primary Examiner* — Christopher P Jones
*Assistant Examiner* — Phillip Y Shao

(57) ABSTRACT

The present invention provides a fluid inlet device (1) for a separator, comprising a lower part (2) and an upper part (3), wherein the lower part (2) comprises an inner wall surface (4) having a horizontal cross-section comprising a circular arc, a top section (5) comprising a fluid outlet (6), a bottom section (7) comprising a liquid outlet (8), and a tangential fluid inlet (9) for introduction of a fluid flow to the inner wall surface (4); the upper part (3) comprises multiple guiding vanes (10) arranged to guide a fluid flow, entering the upper part through the fluid outlet (6), in a horizontal direction away from the fluid outlet.

13 Claims, 5 Drawing Sheets

Figure 3:
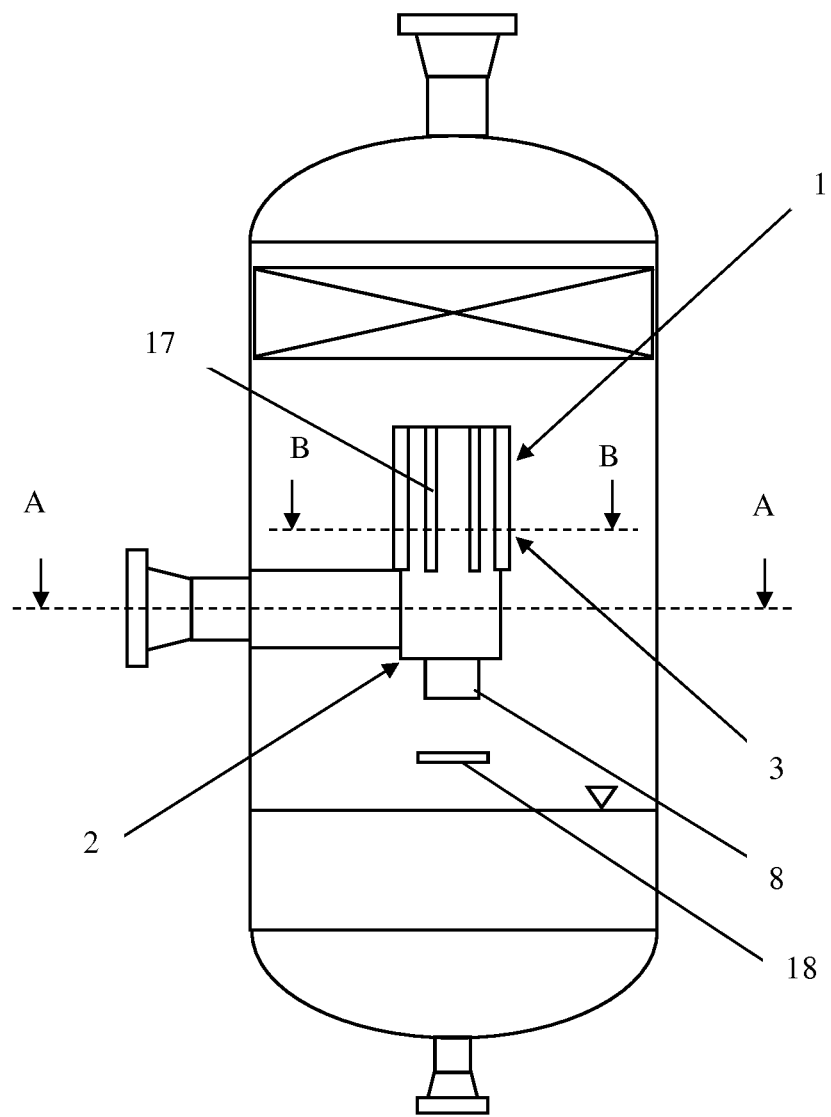

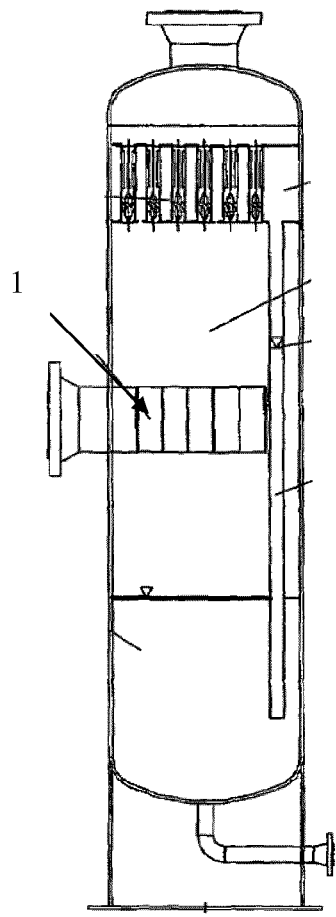
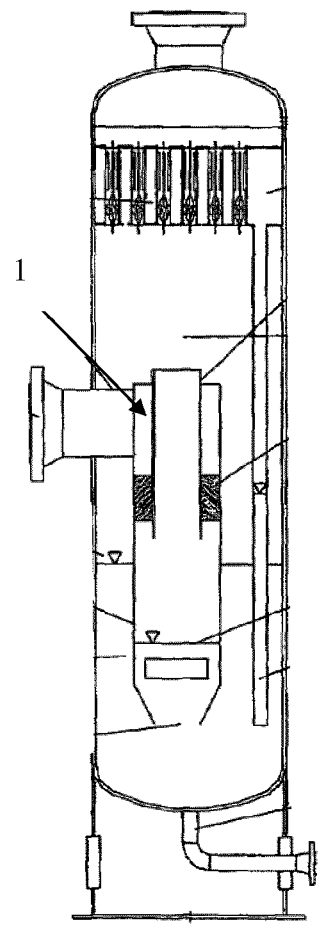
Fig. 1 (prior art)
Fig. 2 (prior art)

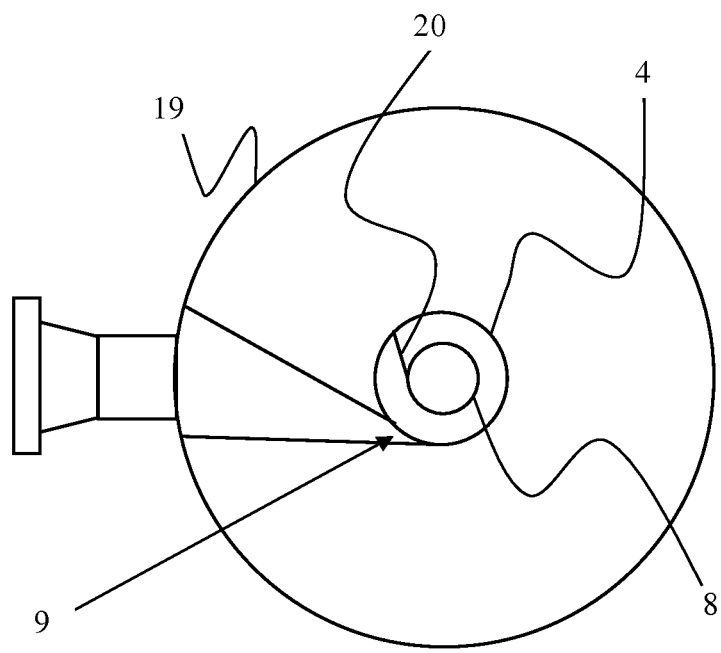
Fig. 4 (A-A)
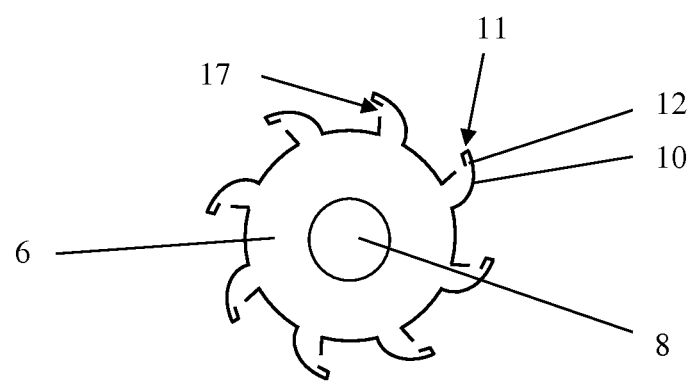
Fig. 5 (B-B)

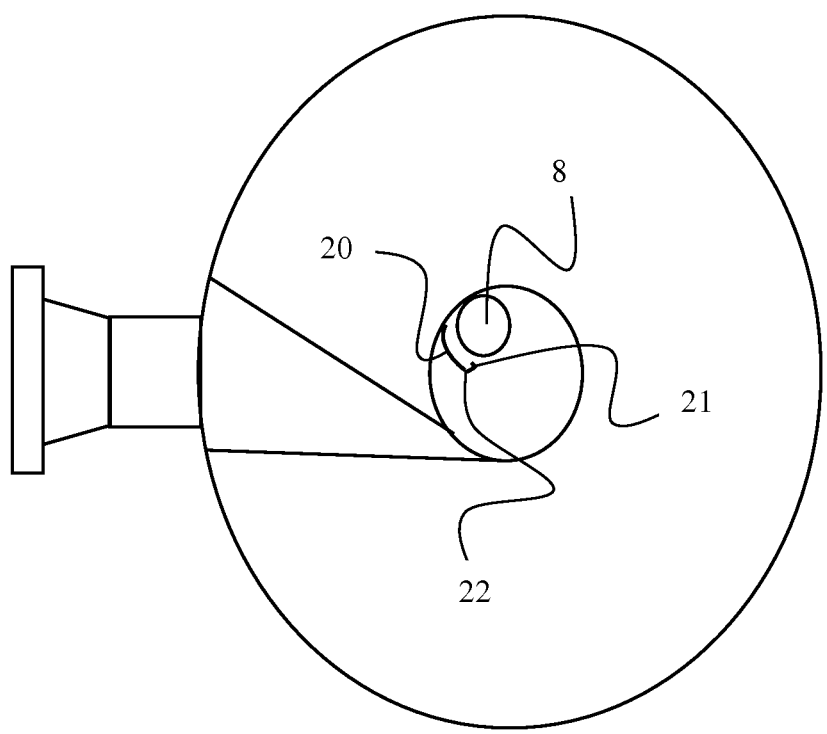
Fig. 8 (A-A)

FLUID INLET DEVICE FOR USE IN GAS LIQUID SEPARATORS

FIELD OF THE INVENTION

The present invention relates to the field of gas liquid separation, and more particularly to a fluid inlet device for use in gas liquid separators.

BACKGROUND

In liquid gas separators an inlet device is commonly used to provide an initial bulk separation of the liquid gas mixture, as well as to improve the flow distribution to demisting equipment in the upper section of the separator. The inlet devices are usually based on one of two distinct principles of separation; by use of vanes type inlet devices or cyclonic type inlet devices.

Examples of such inlet devices are disclosed in for instance US2005/0060970, US20080168753 and U.S. Pat. No. 7,144,437.

All of the known types of inlet devices have shortcomings regarding their ability to handle a broad range of liquid loads.

That is, vane-based inlet devices are unsuitable for handling high liquid loads (>3% inlet volume fraction), since the separation efficiency is usually low. In contrast, inlet cyclones can handle high liquid loads, however depending on physical properties they can induce substantial gas velocities on the liquid surface that often leads to additional issues like the formation of foam, liquid re-entrainment and gas carry under (gas bubbles at the outlet liquid stream).

Gas/liquid separators, such as scrubbers, are facing increasingly more challenging feed streams. Scrubbers are gas/liquid separators designed to provide a gas stream having a very low liquid content, typically in the order of 0.1 USG/MMSCF. There is consequently a need to improve the efficiency of gas/liquid separators, in particular for scrubber applications upstream of compressors, since compressors are not tolerant to liquid carry-over from the scrubber.

Thus, the present invention relates to a novel inlet device suitable to be installed in various gas/liquid separators such as vertical scrubbers in order to enhance the gas-liquid separation efficiency in the inlet section. The novel inlet device allows for handling higher flow rates and higher liquid loads compared to the standard inlet devices.

SUMMARY OF THE INVENTION

The present invention is defined by the attached claims and in the following:

In a first aspect, the present invention provides a fluid inlet device for a separator, comprising a lower part and an upper part, wherein
- the lower part comprises an inner wall surface having a horizontal cross-section comprising a circular arc, a top section comprising a fluid outlet, a bottom section comprising a liquid outlet, and a tangential fluid inlet for introduction of a fluid flow to the inner wall surface, such that the fluid flow is separated into a gas phase and a liquid phase by centrifugal force during use;
- the upper part comprises multiple guiding vanes arranged to guide a fluid flow, entering the upper part through the fluid outlet, in a horizontal direction away from the fluid outlet.

The fluid flow guided in a horizontal direction away from the fluid outlet is led out of the upper part of the fluid inlet device. The fluid outlet in the lower part functions as a fluid passage between the lower part and the upper part of the fluid inlet device, i.e. the lower part and the upper part is in fluid communication via the fluid outlet in the lower part. The multiple guiding vanes are arranged to provide multiple fluid outlets in the upper part of the fluid inlet device. The multiple fluid outlets in the upper part guide the fluid flow out of the fluid inlet device.

In one embodiment of the fluid inlet device, each of the multiple guiding vanes comprises a pocket arranged to capture a liquid film migrating along the guiding vane during use.

The multiple guiding vanes are preferably arranged such that a liquid film will migrate along an inner surface of the guiding vanes. The pocket of on the guiding vanes is arranged such that the captured liquid film is drained out of the pocket.

In one embodiment of the fluid inlet device, the horizontal cross-section of the inner wall is circular.

The multiple guiding vanes are arranged and curved such that a liquid phase of a fluid flow entering the upper part of the fluid inlet device will coalesce on the inner surface of the guiding vanes due to centrifugal force. In one embodiment of the fluid inlet device, each of the multiple guiding vanes comprises a vertical edge being distal to the fluid outlet of the lower part, at which edge the pocket is arranged.

In an embodiment of the fluid inlet device, the pocket is formed by a longitudinal rib having an angled or curved cross-section. The rib is arranged such that a liquid film migrating along the guiding vane is captured and drained away from the guiding vane. Preferably, the rib is arranged in a substantially vertical direction.

In an embodiment, each of the multiple guiding vanes comprises an inner vertical surface. Preferably, the pocket or rib is arranged on the inner vertical surface or at the substantially vertical edge distal to the circular opening.

In an embodiment of the fluid inlet device, the upper part comprises a top plate arranged on top of (i.e. above) the multiple guiding vanes, the top plate may optionally comprise a center opening.

In an embodiment of the fluid inlet device, the top section of the lower part comprises a plate element in which the fluid outlet is arranged.

In an embodiment of the fluid inlet device, the plate element extends at least from a top edge of the inner wall surface to the circumference of the fluid outlet in the lower part.

The plate element forms a lip (i.e. a plate extension) around an upper edge of the inner wall (or inner wall surface), the lip extends from the upper edge such that liquid accumulating on said wall is prevented from entering the upper part. The lip may preferably extend in a direction being perpendicular to the inner wall surface.

In an embodiment of the fluid inlet device, the multiple guiding vanes are arranged on an upper surface of the plate element, and each vane preferably extends from an inner circumference to at least an outer circumference of the plate element. Advantageously, the vanes extend beyond the outer circumference of the plate element, such that liquid coalesced on the vanes is easily drained off or away from the fluid inlet device.

In an embodiment of the fluid inlet device, the cross-sectional area of the fluid outlet in the lower part is larger than the cross-sectional area of the liquid outlet; preferably the ratio of the cross-sectional area of the fluid outlet and the liquid outlet is more than 2, preferably more than 3.

In an embodiment of the fluid inlet device, the cross-sectional area of the fluid outlet in the lower part is smaller than the horizontal cross-sectional area of the inner circumferential wall.

In one embodiment, the fluid inlet device comprises a fluid obstruction vane arranged at the inner wall surface. The fluid obstruction vane is arranged such that a liquid flow along the inner wall surface is captured and drained out of the lower part via the liquid outlet.

In an embodiment of the fluid inlet device, the guiding vanes are curved, preferably such that the inner surface of the guiding vanes is concave. The guiding vanes are arranged such that a fluid flow will exit the upper part having the same or opposite rotational direction as a fluid flow entering the upper part through the fluid outlet in the top section. The arrangement of the vanes depends on the specific requirements of the application, mostly related to pressure drop requirements.

In an embodiment, the fluid inlet device comprises a liquid protection plate arranged below the liquid outlet.

In a second aspect, the present invention provides a separator comprising a fluid inlet device according to the first aspect. The separator is preferably a gas/liquid separator, and even more preferred a vertical gas/liquid separator.

In a third aspect, the present invention provides a method of separating a gas/liquid flow, comprising the steps of:
providing a fluid inlet device having a lower part and an upper part, wherein the lower part is arranged to separate a gas/liquid flow by use of centrifugal force, and the upper part is arranged to separate a gas/liquid flow by passing the flow over multiple guiding vanes;
leading the gas/liquid flow into the lower part of the fluid inlet device;
separating a major part of the liquid from the gas by use of centrifugal force;
leading the remaining gas and a minor part of the liquid in a vertical upwards direction to the upper part of the fluid inlet device, for instance via a fluid passage between the lower part and the upper part; and
separating the minor part of the liquid from the remaining gas by leading the minor part of the liquid and the remaining gas in a horizontal direction by use of multiple guiding vanes on which the minor part of the liquid may coalesce by use of centrifugal force.

Commonly, the minor part of the liquid is in the form of droplets, which will coalesce on a surface of the multiple guiding vanes.

In one embodiment, the method comprises the steps of:
capturing the coalesced liquid in pockets arranged on the multiple guiding vanes; and
draining the captured coalesced liquid out of the pockets, preferably in a vertical direction.

The term "tangential fluid inlet" is in the present specification intended to mean a fluid inlet able to provide a fluid flow onto the inner wall of the cyclonic separation section in an initial direction suitable for inducing a curved or swirling motion to the fluid flow along said inner wall. The initial direction is preferably tangential to the inner wall at the point of flow introduction.

SHORT DESCRIPTION OF THE DRAWINGS

Figure 6:
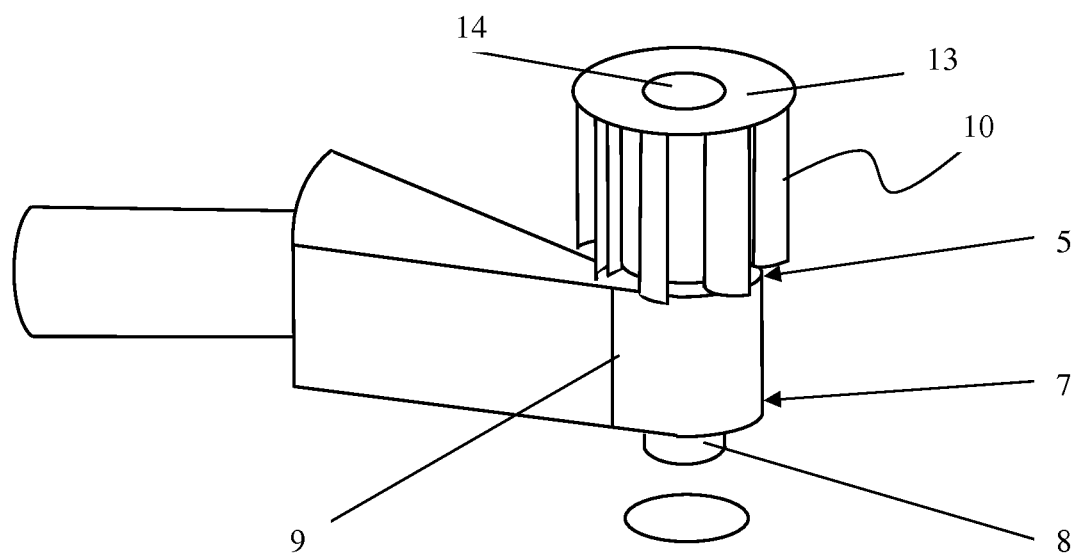
Figure 7:
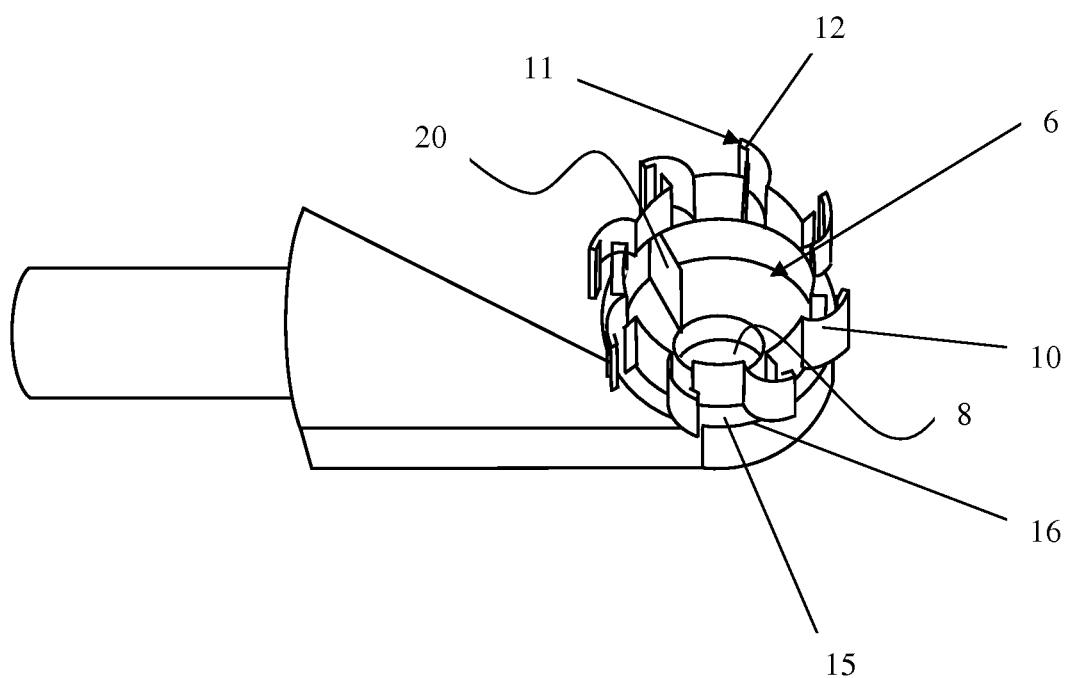

The invention is described in detail by reference to the following drawings:
FIG. 1 is a cross-sectional side view of a prior art scrubber featuring a vane inlet device.
FIG. 2 is a cross-sectional side view of a prior art scrubber featuring a cyclonic inlet device.
FIG. 3 is a cross-sectional side view of a scrubber featuring a fluid inlet device according to the invention.
FIG. 4 is a transverse cross-sectional view of the fluid inlet device in FIG. 3.
FIG. 5 is a transverse cross-sectional view of the fluid inlet device in FIG. 3.
FIG. 6 is a perspective side view of the fluid inlet device in FIG. 3.
FIG. 7 is a perspective top view of the fluid inlet device in FIG. 3.
FIG. 8 is a transverse cross-sectional view of a further embodiment of a fluid inlet device according to the invention.

DETAILED DESCRIPTION OF THE INVENTION

Two prior art fluid inlet devices are shown in FIGS. 1 and 2. Each of the fluid inlet devices is arranged in a scrubber vessel. The inlet device in FIG. 1 provides an initial gas/liquid separation by the use of vanes, while the inlet device in FIG. 2 provides an initial gas/liquid separation by use of an inlet cyclone (or hydrocyclone). As discussed above, both types of inlet devices have shortcomings regarding their ability to handle various flow regimes.

The present invention provides a novel fluid inlet device as shown in FIGS. 3-7, which comprises a cyclonic separation section 2 (i.e. a lower part) for removal of bulk liquids by use of centrifugal force, in combination with a guiding vanes section 3 (i.e. an upper part) arranged above the cyclonic separation section to remove the remaining droplets from the gas stream.

The fluid inlet device has been developed with the aim of:
Minimizing the effect of unstable fluid flow conditions in the upstream piping of a gas/liquid separator, i.e. scrubber.
Minimizing the destruction of any existing liquid film coming from the upstream piping of the separator. The cyclonic separation section provides an initial bulk separation of the incoming fluid flow, directing the bulk liquid toward the bottom of the cyclonic separation section and the gas phase in an upwards direction.
Removing droplets from the gas phase exiting the cyclonic separation section. Due to the curved geometry of the guiding vanes, the droplets are directed towards the guiding vane walls where they coalesce, then the created coalesced liquid film/layer continues flowing towards the pockets where it is captured and drained in a downwards direction.
Minimizing the amount of gas flow hitting the liquid surface at the bottom of the scrubber, in order to limit liquid re-entrainment. An anti-re-entrainment plate is installed below the drain pipe (i.e. the liquid outlet) to protect the liquid surface.
Feeding the scrubber/separator symmetrically from the center as opposed from the side, while still obtaining a tangential direction of the inlet flow relative an inner wall surface of the cyclonic separation section. This is obtained by use of a tangential connecting box.

The features of this device include the special design of pocketed guiding vanes 10 (see FIG. 5) in an upper part 3 of the device. Said vanes provide multiple tangential outlets 17 for the gas flow entering the upper part from the cyclonic separation section 2 of the device, while capturing a substantial amount of the droplets entrained in the gas flow. The tangential exit of the gas flow is also beneficial for improving the gas distribution in the upper section of a scrubber (i.e. gas/liquid separator), as well as to re-direct any droplets remaining in the gas flow towards the inner walls of the scrubber.

A fluid inlet device 1 according to the present invention arranged in a scrubber is shown in FIG. 3. The fluid inlet device comprises a cyclonic separation section 2, wherein a bulk separation of a gas/liquid flow is performed by use of centrifugal force. The bulk separated liquid exits the cyclonic separation section 2 via a liquid outlet 8 in the bottom section of the lower part. An anti-re-entrainment plate 18 (or liquid protection plate) is arranged below the liquid outlet to limit the re-entrainment of droplets, from the liquid accumulated at the bottom of the vessel, into the gas phase.

A cross-sectional view A-A of the cyclonic separation section 2 and the wall 19 of the scrubber is shown in FIG. 4. The cyclonic separation section 2 comprises a tangential inlet 9 for a fluid flow to be separated, a circular inner wall surface 4, a fluid obstruction vane 20 and the liquid outlet 8.

The gas-liquid mixture (i.e. fluid flow to be separated) originates from an upstream piping into the fluid inlet device 1 of the scrubber. The flow is passed by means of a tangential connecting box (providing the tangential inlet 9) into the cyclonic separation section 2. Due to the applied centrifugal force, the bulk liquid of the fluid flow is separated from the major part of the gas phase and flows over the inner wall surface 4 of the cyclonic separation section. In this particular embodiment, the inner wall surface have a circular horizontal cross-section. However, embodiments wherein the inner wall surface have a horizontal cross-section comprising only a circular arc (i.e. not a full circular cross-section) is also contemplated. The circular arc may for instance extend from the tangential inlet to the fluid obstruction vane. The fluid obstruction vane 20 interrupts the flow of the bulk liquid, which is then drained out of the cyclonic separation section via the central bottom pipe 8 (i.e. a liquid outlet) arranged in a bottom section 7. In some embodiments, the fluid obstruction vane 20 may advantageously comprise a pocket and/or may have a curved shape, as described for the guiding vanes 10. The bulk liquid exits the liquid outlet at the bottom of the cyclone along with a minor part of the gas phase. In some embodiments, the liquid outlet may advantageously be arranged off-center, for instance below or in front of the fluid obstruction element. The anti-re-entrainment plate 18 is arranged below the liquid outlet 8 to avoid direct impact of the minor part of the gas phase on the liquid surface at the bottom of the scrubber.

The major part of the gas phase and the remaining liquid droplets flow upwards at the center of the cyclonic separation section 2 and through the circular opening 6 (i.e. a fluid outlet) to the guiding vanes section 3 (i.e. the upper part) of the fluid inlet device, see FIGS. 5 and 7. For illustrative purposes, the plate element 15 in which the circular opening 6 is arranged is omitted from FIG. 5. The plate element is arranged between the cyclonic separation section 2 and the guiding vanes section 3, and prevents the bulk liquid flow along the inner wall surface of the cyclonic separation section from entering the guiding vanes section. In the guiding vanes section, the mixture of gas and liquid droplets exits the fluid inlet device in a tangential manner by passing multiple curved guiding vanes 10. Each of the multiple guiding vanes comprises a pocket 12 arranged on one end of the guiding vane to capture/trap most of the remaining droplets, which coalesce on the guiding vanes. In this particular embodiment, the pocket is arranged at the vertical edge 11, i.e. the edge of the guiding vane being distal to the circular opening 6. After capture, the coalesced droplets are drained in a downwards direction. The guiding vanes extend beyond the upper edge 16 of the cyclonic separation section, such that coalesced liquid is easily drained away from the fluid inlet device. Further, in this particular embodiment the guiding vanes section, see FIG. 6 comprises a top plate 13 having a hole 14 (i.e. center opening) in the center to reduce the gas recirculation above the fluid inlet device, as well as to improve the flow distribution in the upper section of the scrubber. The presence of the hole 14 is not an essential feature and it may be omitted depending on the specific application of the fluid inlet device.

A topside perspective view of the fluid inlet device without the top plate 13 is shown in FIG. 7.

A cross-sectional view of an alternative embodiment of the fluid inlet device is shown in FIG. 8. The view corresponds to the A-A section shown in FIG. 4. In this embodiment, the fluid obstruction vane 20 features a pocket 21 at the vane edge 22 and have a curved shape. Further, the liquid outlet 8 is positioned off center and in front of the fluid obstruction vane, i.e. in front of the vane surface facing a bulk liquid flow along the inner wall surface.

The invention claimed is:

1. A fluid inlet device for a separator having an outer wall which comprises an inner surface that defines an interior of the separator, the fluid inlet device comprising:
    a lower part and an upper part which are configured to be positioned in the interior of the separator radially inwardly of the inner surface of the outer wall of the separator;
    wherein the lower part comprises an inner wall surface having a horizontal cross-section comprising a circular arc, a top section comprising a fluid outlet, a bottom section comprising a liquid outlet, and a tangential fluid inlet for introduction of a fluid flow to the inner wall surface;
    wherein the upper part comprises multiple guiding vanes arranged to guide a fluid flow entering the upper part through the fluid outlet in a horizontal direction away from the fluid outlet; and
    wherein the upper part comprises a top plate which extends radially over the multiple guiding vanes.

2. The fluid inlet device according to claim 1, wherein each of the multiple guiding vanes comprises a pocket arranged to capture a liquid film migrating along the guiding vane.

3. The fluid inlet device according to claim 2, wherein each of the multiple guiding vanes comprises a substantially vertical edge distal to the fluid outlet, and wherein the pocket is arranged at the vertical edge.

4. The fluid inlet device according to claim 1, wherein the top section of the lower part comprises a plate element in which the fluid outlet is arranged.

5. The fluid inlet device according to claim 4, wherein the plate element extends at least from a top edge of the inner wall surface to a circumference of the fluid outlet.

6. The fluid inlet device according to claim 4, wherein each of the guiding vanes is arranged on an upper surface of the plate element and extends from an inner circumference to an outer circumference of the plate element.

7. The fluid inlet device according to claim 1, further comprising a fluid obstruction vane arranged at the inner wall surface.

8. The fluid inlet device according to claim 1, wherein a cross-sectional area of the fluid outlet is larger than a cross-sectional area of the liquid outlet.

9. The fluid inlet device according to claim 1, wherein the guiding vanes are curved.

10. The fluid inlet device according to claim 1, further comprising a liquid protection plate arranged below the liquid outlet.

11. The fluid inlet device according to claim 6, wherein each guiding vane extends from an inner circumference of the plate element to beyond an outer circumference of the plate element.

12. The fluid inlet device according to claim 8, wherein a ratio of the cross-sectional area of the fluid outlet to the cross-sectional area of the liquid outlet is greater than 2.

13. The fluid inlet device according to claim 8, wherein a ratio of the cross-sectional area of the fluid outlet to the cross-sectional area of the liquid outlet is greater than 3.

* * * * *